(12) United States Patent
Kozel et al.

(10) Patent No.: US 11,451,015 B2
(45) Date of Patent: *Sep. 20, 2022

(54) SUBSTATION CONTAINING SWITCHGEAR OR CONTROLGEAR WITH UNMANNED OPERATION AND MAINTENANCE

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB Schweiz AG, Baden (CH)

( * ) Notice: Subject to any disclaimer, the term of this patent is extended or adjusted under 35 U.S.C. 154(b) by 23 days.

This patent is subject to a terminal disclaimer.

(21) Appl. No.: 16/724,479

(22) Filed: Dec. 23, 2019

(65) Prior Publication Data

US 2020/0127447 A1   Apr. 23, 2020

Related U.S. Application Data

(63) Continuation of application No. PCT/EP2018/067483, filed on Jun. 28, 2018.

(30) Foreign Application Priority Data

Jun. 28, 2017  (EP) ..................... 17178385
Dec. 21, 2017  (EP) ..................... 17209512

(51) Int. Cl.
*H02B 3/00*   (2006.01)
*H02B 7/06*   (2006.01)
(Continued)

(52) U.S. Cl.
CPC .............. *H02B 3/00* (2013.01); *B25J 11/005* (2013.01); *H02B 7/00* (2013.01); *H02B 7/06* (2013.01)

(58) Field of Classification Search
CPC .... H02B 7/00; H02B 7/06; B25J 11/00; B25J 11/05

See application file for complete search history.

(56) References Cited

U.S. PATENT DOCUMENTS 7,576,985 B2 *  8/2009  Kingston .............. H02B 13/025
                                                         165/104.33
8,878,687 B2 * 11/2014  Shiraishi .............. H05K 5/0021
                                                         340/693.6
(Continued)

FOREIGN PATENT DOCUMENTS

CN         101604825 A       12/2009
CN         101692530 A       4/2010
(Continued)

OTHER PUBLICATIONS

Jean-Francois Allan et al.: "Robotic systems applied to power substations—A state-of-the-art survey", Proceedings of The 2014 3rd International Conference on Applied Robotics for the Power Industry. Jan. 1, 2014 (Jan. 1, 2014), pp. 1-6, XP055471456.

(Continued)

*Primary Examiner* — Robert J Hoffberg
(74) *Attorney, Agent, or Firm* — Leydig, Voit & Mayer, Ltd.

(57) ABSTRACT

A substation contains a switchgear or controlgear, in particular at least one low voltage switchgear or controlgear configured for unmanned operation and maintenance. An inner room, where the switchgear or controlgear are located in, is hermetically enclosed by an outer housing. The inner room is locked against the outer housing by an inner, automatically operated door. A robot system is implemented such that the robot system's acting area is extended from the inner room, partly in the area outside the inner room, but (Continued)

inside the outer housing, where spare parts are stored in a spare parts hand over area, for maintenance.

4 Claims, 3 Drawing Sheets

(51) Int. Cl.
  *B25J 11/00* (2006.01)
  *H02B 7/00* (2006.01)

(56) References Cited

U.S. PATENT DOCUMENTS

| | | | |
|---|---|---|---|
| 10,744,124 | B2 | 8/2020 | Zaid et al. |
| 10,751,330 | B2 | 8/2020 | Zaid et al. |
| 11,146,045 | B2 * | 10/2021 | Kozel ................ H02B 11/133 |
| 2004/0176875 | A1 | 9/2004 | Iribe et al. |
| 2011/0067781 | A1 | 3/2011 | Osborne |
| 2013/0231779 | A1 | 9/2013 | Purkayastha et al. |
| 2015/0364285 | A1 | 12/2015 | Shinde et al. |
| 2017/0085064 | A1 * | 3/2017 | Cassimere ............... H02B 7/01 |
| 2020/0127446 | A1 * | 4/2020 | Kozel ................... B25J 11/005 |
| 2020/0127448 | A1 * | 4/2020 | Kozel ...................... H02B 3/00 |
| 2020/0136357 | A1 * | 4/2020 | Kozel ...................... H02B 7/00 |
| 2020/0136358 | A1 * | 4/2020 | Kozel ................... B25J 11/005 |
| 2020/0147061 | A1 | 5/2020 | Zaid et al. |
| 2020/0153210 | A1 * | 5/2020 | Kozel ................... B25J 11/005 |
| 2020/0265572 | A1 * | 8/2020 | Rossano ............ G01N 21/8851 |

FOREIGN PATENT DOCUMENTS

| | | |
|---|---|---|
| CN | 102056581 A | 5/2011 |
| CN | 102122844 A | 7/2011 |
| CN | 102280826 A | 12/2011 |
| CN | 202333477 U | 7/2012 |
| CN | 102856827 A | 1/2013 |
| CN | 202649815 U | 1/2013 |
| CN | 202678813 U | 1/2013 |
| CN | 203660309 U | 6/2014 |
| CN | 203788404 U | 8/2014 |
| CN | 204012372 U | 12/2014 |
| CN | 205021584 U | 2/2016 |
| CN | 105415380 A | 3/2016 |
| CN | 205206469 U | 5/2016 |
| CN | 205380658 U | 7/2016 |
| CN | 105881505 A | 8/2016 |
| CN | 105958344 A | 9/2016 |
| CN | 106003084 A | 10/2016 |
| CN | 106165048 A | 11/2016 |
| CN | 106223775 A | 12/2016 |
| CN | 106340006 A | 1/2017 |
| CN | 205944755 U | 2/2017 |
| CN | 106647569 A | 5/2017 |
| CN | 106856311 A | 6/2017 |
| GB | 1524109 A | 9/1978 |
| JP | 6-233419 A | 8/1994 |
| JP | H 09130929 A | 5/1997 |
| JP | 2007172735 A | 7/2007 |
| KR | 10-1608325 B1 | 4/2016 |
| WO | 2015081455 A1 | 6/2015 |

OTHER PUBLICATIONS

Terence Hazel et al.: "IEC switchgear & controlgear—internal arc withstand a designer's and user's view", PCIC Europe 2013, Jun. 1, 2011 (Jun. 1, 2011), pp. 1-12, XP055514149.

Chen, "Electrical Design Manual for Intelligent Building," *China Building Materials Industry Press*, Book 2, 1115-1119 (Aug. 1999).

Lu et al., "Mobile Robot for Power Substation Inspection: A Survey," *IEEE/CAA J. of Automatica Sinica*, 4(4), 830-847 (Jan. 25, 2017).

Menéndez et al., "Robotics in Power Systems: Enabling a More Reliable and Safe Grid," *Industrial Electronics Magazine*, IEEE, 11(2), 22-34 (Jun. 23, 2017).

Toth et al., "Smart View for a Smart Grid—Unmanned Aerial Vehicles for Transmission Lines," *2010 1st International Conference on Applied Robotics for the Power Industry*, IEEE, 1-6 (Oct. 5-7, 2010).

Velrajkumar et al., "Development of Real-Time Tracking and Control Mobile Robot using Video Capturing Feature for Unmanned Applications," *2010 International Conference on Communication Control and Computing Technologies IEEE*, 90-92 (Oct. 7-9, 2010).

* cited by examiner

SUBSTATION CONTAINING SWITCHGEAR OR CONTROLGEAR WITH UNMANNED OPERATION AND MAINTENANCE

CROSS-REFERENCE TO PRIOR APPLICATIONS

This application is a continuation of International Patent Application No. PCT/EP2018/067483, filed on Jun. 28, 2018, which claims priority to European Patent Application Nos. EP 17178385.5, filed on Jun. 28, 2017 and EP 17209512.7, filed on Dec. 21, 2017. The entire disclosures of the prior applications is hereby incorporated by reference herein.

FIELD

The invention relates to a substation containing switchgear or controlgear, in particular at least on low voltage switchgear, with unmanned operation and maintenance.

BACKGROUND

The switchgear or controlgear with unmanned operation and maintenance excludes human operators from operation and maintenance processes of the switchgear or controlgear as we know them today. So far systems like that are automized, nevertheless, the entrance for human operators has to be restricted, when primary circuits are energized.

SUMMARY

In an embodiment, the present invention provides a substation containing a switchgear or controlgear, in particular at least one low voltage switchgear or controlgear configured for unmanned operation and maintenance. An inner room, where the switchgear or controlgear is located, is hermetically enclosed by an outer housing. The inner room is locked against the outer housing by an inner, automatically operated door. A robot system is implemented such that the robot system's acting area is extended from the inner room, partly in the area outside the inner room, but inside the external housing of the substation, where spare parts are stored in a spare parts hand over area, for maintenance.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
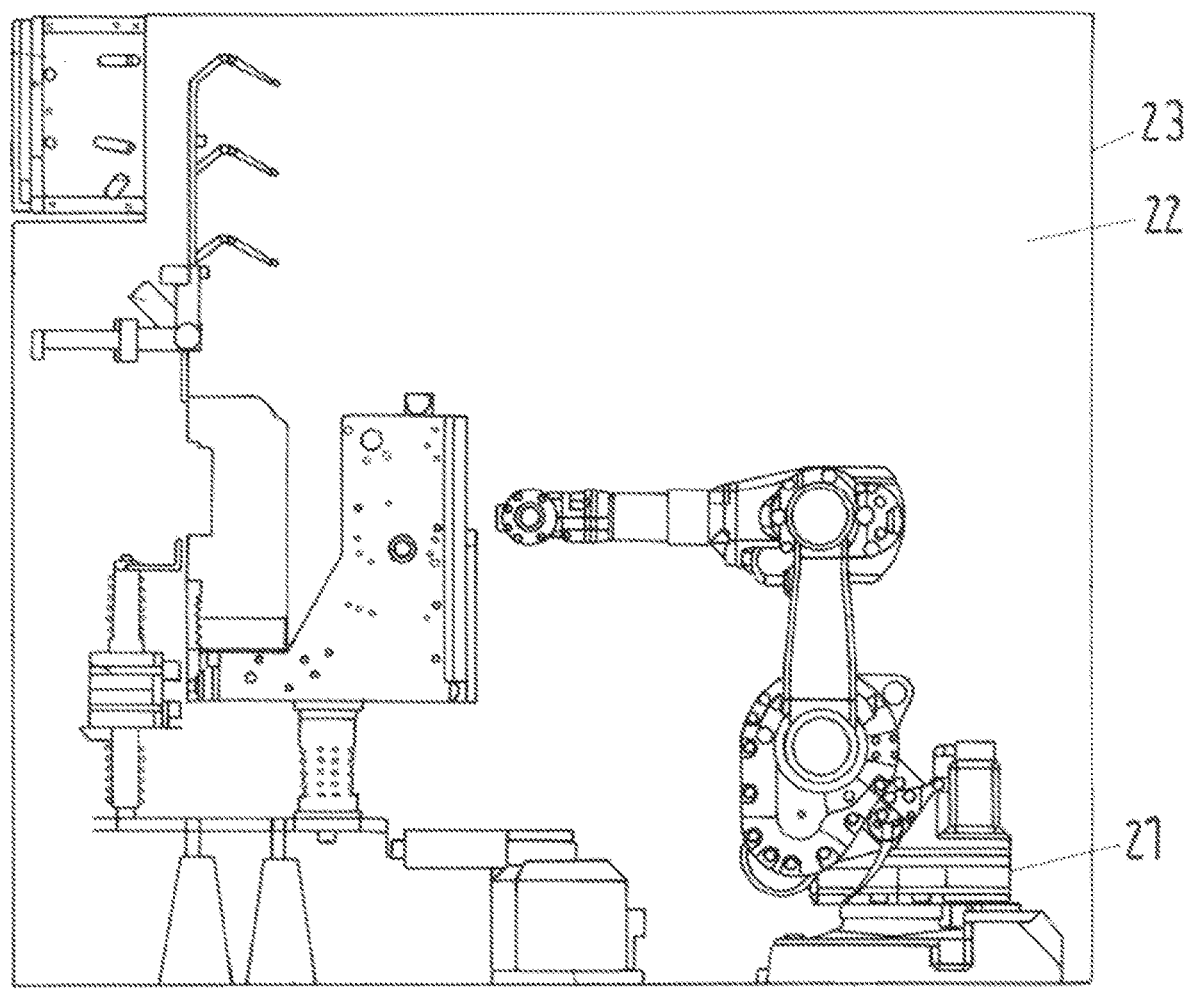
FIG. 1 is an example cross section of switchgear or controlgear with unmanned operation and maintenance, according to an embodiment.

An object of an embodiment of the invention is, to proceed the operating and/or maintenance of such substations in an automized way, and just in case of further need of human operator, to enhance security for the human operator.

First, the aforesaid substation is operated automatically. For that, a robot system is used, to operate inside an operation room where the switchgear or the controlgear, in particular the at least one low voltage switchgear or controlgear, is located in, and which is implemented inside the outer housing.

Therefore further several sensor means located in the area between the inner room and the external housing, and/or at the door of the external housing, which are able to detect the entrance of a human operator.

A feature of an embodiment of the invention is, that if the inner room is automatically restricted by inner door locking when current carrying parts are energized, the switchgear or controlgear doesn't need a further compartment.

The robotic system of the switchgear or the controlgear, in particular the low voltage switchgear or controlgear, with unmanned operation and maintenance can require maintenance and spare parts sourcing. The robotic system is inaccessible by human inside the switchgear or controlgear outer housing when the primary circuits are energized.

By adding the robotic system to inner space or room of the switchgear or controlgear, a new complex system was however introduced into the switchgear or controlgear and this system would require maintenance itself. Another expectation is, that the robotic system can get spare parts for the switchgear or controlgear maintenance. Even though the human interactions with the switchgear or controlgear can be much less frequent in comparison to current practices, the human operator safety interlocks for the switchgear or controlgear with unmanned operation and maintenance can be defined.

In a further embodiment the robotic system is provided with a tool changing system, which may be used to change/switch between various tools for maintenance and service activates, in particular for detaching or attaching and/or exchanging switchgear or controlgear components, for example withdrawable modules and/or module components, connectors and the like, in an at least partly automated way.

Exemplary tools may be for example a gripper and/or screwdriver.

Furthermore, a tool storage may be provided to store and provide the various tools for the tool changing system of the robotic system or manipulator.

In a further advantageous embodiment, human operator presence sensors are implemented inside the external housing of the substation, in such, that if current carrying parts inside the inner room, where the switchgear or controlgear is located, are energized, locking means at the door of the inner room automatically lock that door, where inside the inner room only the robot system is allowed to operate.

In a further advantageous embodiment, the inner room is as well a hermetically closable compartment.

By that it is possible, that inside this inner compartment of the substation, the switchgear as such need no further enclosure itself, because it is secured against entrance of human operator by the locked door, in case of energized current carrying parts.

According to the method of operating such a substation, the inner room is locked against the outer housing by an inner, automatically operated door, and that locking and de-locking of that door is logically controlled by evaluation of an automatic sensing of the presence of human operator and the energy status on current carrying parts of the switchgear or controlgear and/or the busbars, and that a robot system is implemented in such, that the robot systems acting area is extended from in the inner room, partly in the area outside the inner room, but inside the external housing, where spare parts are stored in a spare parts hand over area, for maintenance.

An advantageous method for maintenance is, that for maintenance or repair of the robot, an area is predefined as repair and maintenance area, which is located outside the inner room and inside the external housing, where human operator is allowed to enter, if the inner room, where the switchgear or controlgear of the inner room are energized, is locked by the door of the inner room. By that, high requirements for human operators safety is given.

Figure 2:
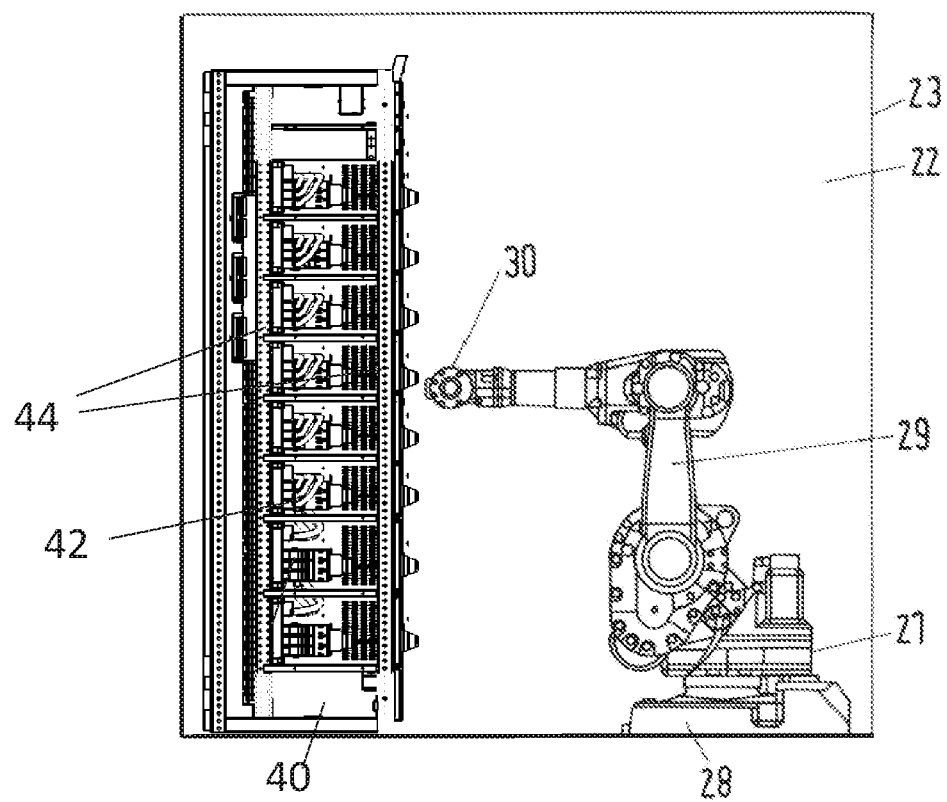
FIG. 2 is an example cross section of a low voltage switchgear or controlgear with unmanned operation and maintenance, according to an embodiment.

FIG. 1 and FIG. 2 show exemplary embodiments of switchgear or controlgear with unmanned operation and maintenance.

In FIG. 2 an exemplary low voltage switchgear or controlgear with unmanned operation and maintenance is disclosed. The low voltage switchgear 40 comprises a mounting frame 44 and several withdrawable modules 42.

In an embodiment, there are two options for accessing the robotic system and supplying the spare parts for the switchgear or controlgear:
- either all primary circuits of the switchgear or controlgear have to be completely de-energized to make the switchgear or controlgear internal space 22 safe for human access, or
- the robotic system 21 has to be allowed to get out of the switchgear or controlgear outer housing 23 for interaction if necessary.

Figure 3:
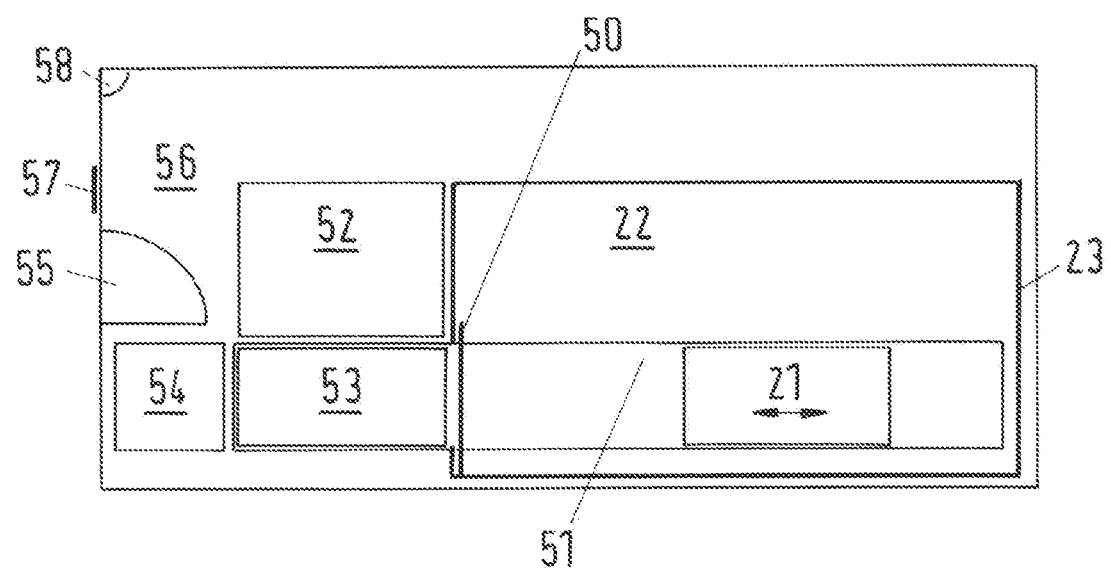
FIG. 3 is an example of the substation floor plan and location of the human-machine interfaces for a switchgear or controlgear with unmanned operation, according to an embodiment.

The second option is more desirable with respect to the switchgear or controlgear service continuity and uptime. To allow robotic system 21 movement out of the enclosure a dedicated door 50 on the switchgear or controlgear outer housing 23 are provided—see FIG. 3.

The door is arc proof when closed and dimensioned to allow passing of the robotic system with docked manipulator through. The door open only for the period needed for the robot moving through, they are closed for the rest of the time. The door is preferably located on one lateral side of the switchgear or controlgear to allow predefined robotic movement area 51 to be as simple and narrow as possible.

The robotic system predefined movement area 51 is extended out of the switchgear or controlgear outer housing 23. The default robotic system position is inside the switchgear or controlgear outer housing 23 where it fulfills its tasks.

During the short period of robot moving through opened door 50 the arc proof enclosure 23 of the switchgear or controlgear is compromised. Human personnel safety can be ensured at that time by making sure no operator is in the substation internal space 56 before opening the switchgear or controlgear door 50. An interlocking system for the switchgear or controlgear door 50 can be applied preventing its opening in following cases:
- An operator is present in the substation internal space 56 or robot repair area 54.
- The door to substation 55 is opened.

The operator presence in the substation can be learned by one or combination of following systems:
- Person presence detection system based on human presence sensors 58.
- Manually triggered electrical or mechanical interlock activated by operator before entry at the external substation interface 57. The interlock unlocks the substation door 55 and at the same time locks the switchgear or controlgear door 50.

Another interlocking system acting in the human safety assurance can be applied to the substation entry door 55 preventing opening of the substation entry door from outside in case the switchgear or controlgear door 50 is not positively confirmed closed and locked against opening. Activation of this interlock can be clearly signalled on the local external substation interface 57 for the operator to know the substation entry door 55 is interlocked.

The local external substation interface 57 can provide interface for local commands by operator, who is prepared to enter the substation or who is leaving the substation and local signalization of the switchgear or controlgear status.

The available commands for robotic system can be as minimum:
- Stay in the internal switchgear or controlgear area 22 and lock the switchgear or controlgear door 50 as a human operator is going to enter the substation for spare parts handling or other tasks where robot can stay inside the switchgear or controlgear.
- Get out to human-machine interaction area 53, lock the switchgear or controlgear door 50 and stay docked as a human operator is going to enter the substation for maintenance or repair job on the robotic system.
- All clear—operate freely as no human is inside the substation.

The local external substation interface can be in form of an intelligent electronic device, group of switches or key exchange box or combination of these devices.

Furthermore, a tool storage may be provided within the outer housing 23 to store and provide various tools for the tool changing system of the robotic system to execute maintenance and/or service activities.

To further enhance the human operator safety, two special areas with restricted access can be defined as follows:
- spare parts handover area 52
- robot repair area 54

The spare parts handover area 52 can be built as spare parts storage area, where robot autonomously takes needed spare parts and stores replaced parts. The human-machine interaction in this area is indirect, human is allowed to operate in this area only if robot is not in the human-machine interaction position 53. Human personnel tasks are removing the replaced parts and filling in fresh spare parts in case the stock is used up. The human unauthorized operation in this area is prevented preferably by fencing or enclosure with lock. The lock allows access only if the robotic system is inside the switchgear or controlgear enclosure 23 and the switchgear or controlgear door 50 is locked.

The robot repair area 54 is an area, which is designed for human operator performing the robot repair or maintenance. The robot repair area can be designed so, that with the manipulator docked the human operator can access all points of robot maintenance or repair. It can be safe to run a robot operation routine checks when operator is inside the robot repair area. The repair area is protected against unauthorized entry preferably by fencing or enclosure with lock. The lock allows entry only when robot is in human-machine interaction area 53 with docked manipulator ready for maintenance intervention and the switchgear or controlgear door 50 is locked.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 21 robotic system, robot
22 space, inner room
23 outer housing, arc close
40 low voltage switchgear
42 withdrawable module
44 mounting frame
50 door, automatic door
51 movement area
52 spare parts hand over area
53 interaction area
54 robot repair area
55 substation entry door, outer door
56 external housing of the substation
57 external substation interface
58 human operator presence sensors

The invention claimed is:

1. A substation comprising:
a switchgear or controlgear configured for unmanned operation and maintenance;
a substation entry door configured to permit a human operator entry into the substation;
an inner room, in which the switchgear or controlgear is located, the inner room being hermetically closable by an outer housing and an inner, automatically operated door lockable against the outer housing;
a substation internal space within the substation outside the inner room;
a robot system having a movement area that extends from the inner room to a human-machine interaction area outside the inner room, but in the substation internal space, where spare parts are stored in a spare parts hand over area, for maintenance,
wherein the substation entry door is configured to be unopenable from outside the substation while the inner, automatically operated door is unlocked.

2. The substation according to claim 1, comprising:
human operator presence sensors within the substation internal space,
wherein while the switchgear or control gear are energized, a lock at the door of the inner room automatically locks the door, and
wherein inside the inner room only the robot system is allowed to operate.

3. A method for operating a substation that contains switchgear or controlgear, configured for unmanned operation and maintenance and disposed in an inner room that is hermetically enclosed by an outer housing, the method comprising:
locking the inner room against the outer housing by an inner, automatically operated door;
logically controlling locking and de-locking of the door by evaluation of an automatic sensing of a presence of a human operator outside the inner room and an energy status of current carrying parts of the switchgear or controlgear and/or busbars;
providing a robot system having a movement area that extends from the inner room to a human-machine interaction area outside the inner room, but inside substation internal space, where spare parts are stored in a spare parts hand over area, for maintenance; and
providing a substation entry door configured to permit a human operator entry into the sub station,
wherein the substation entry door is configured to be unopenable from outside the substation while the inner, automatically operated door is unlocked.

4. The method according to claim 3, wherein for maintenance or repair of the robot, an area is predefined as a repair and maintenance area, which is located outside the inner room and inside the substation internal space, where the human operator is allowed to enter, if the inner room, where the switchgear or controlgear of the inner room is energized, is locked by the door of the inner room.

* * * * *